United States Patent [19]

Bedney

[11] Patent Number: 4,596,290
[45] Date of Patent: * Jun. 24, 1986

[54] AGRICULTURAL MACHINE WITH OFFSET FORWARDLY FOLDING FRAME

[76] Inventor: Harris I. Bedney, 3711-31st Ave., Rock Island, Ill. 61201

[*] Notice: The portion of the term of this patent subsequent to Mar. 12, 2002 has been disclaimed.

[21] Appl. No.: 630,041

[22] Filed: Jul. 12, 1984

Related U.S. Application Data

[63] Continuation-in-part of Ser. No. 453,076, Dec. 27, 1982, abandoned.

[51] Int. Cl.[4] .................... B62D 21/14; A01B 73/06
[52] U.S. Cl. ................................ 172/311; 172/677; 280/411 A; 280/656
[58] Field of Search ............... 172/311, 456, 568, 581, 172/586, 587; 280/411 R, 411 A, 656

[56] References Cited

U.S. PATENT DOCUMENTS 4,136,743 1/1979 van der Lely .................. 172/311 X
4,504,076 3/1985 Bedney .......................... 172/311 X Primary Examiner—Richard T. Stouffer
Assistant Examiner—Terrence L. B. Brown
Attorney, Agent, or Firm—Henderson & Sturm

[57] ABSTRACT

A forwardly folding agricultural machine, such as a row crop implement (e.g., planter), including three basic sections, one of which is a rear, central section and the other two of which are respectively right and left wing sections. In operating mode, the wing sections lie at opposite sides of a central hitch and are transversely alined on a line offset forwardly of the rear section. In transport mode, the wing sections fold forwardly, one at each side of the drawbar. The wheels for the sections are arranged so that they do not intervene among the tools, thus enabling easier lateral adjustment of the tools as to row spacing, especially when it is desired to obtain extra narrow spacing.

4 Claims, 2 Drawing Figures

AGRICULTURAL MACHINE WITH OFFSET FORWARDLY FOLDING FRAME

This application is a continuation-in-part of application Ser. No. 453,076, filed Dec. 27, 1982, now abandoned.

BACKGROUND OF THE INVENTION

It is, of course, common practice in the design and use of so-called wide implements to include some provision for decreasing the width for transport of the machine over roads, bridges, etc., and especially through narrow gates and the like. The three basic foldable designs include the rear fold, the forward fold and the upward fold. The present invention is concerned with the forward fold type and is an improvement on or variation of the structure forming the subject matter of the U.S. Pat. No. 4,137,852 to Ronald L. Pratt. The machine in that patent comprises three sections including a central section and a pair of wing sections that flank the central section and are transversely alined therewith and with each other in operating mode. Each section there carries a plurality of planter units transversely adjustable to change row spacing. In transport mode, the wing sections pivot or fold forwardly, one at each side of the central hitch, which, of course, materially reduces the overall transverse dimension of the machine.

It is characteristic of the patented machine that the wheels that carry the sections intervene among the row unit tools and thus interfere with achievement of extra narrow row spacing. According to the present invention, the supporting wheels are so arranged as to avoid this disadvantage. It is another feature of the invention that the central section is rearwardly offset from the transversely alined wing sections in both modes. The rear section includes a transverse frame member or tool bar and the supporting wheels for that section are located ahead of the tool bar. Each wing section is similarly constructed as to the tool bar, and the supporting wheels for each section may be located ahead of the tool bar or laterally outwardly thereof so as to be clear of the tools. It is preferred that the innermost end portions of the wing sections, in operating mode, lie in relatively widely spaced apart relation to each other and thus accommodate the wheels for the rear section. This arrangement, besides increasing the range of adjustment of the row units, also affords good stability of the machine in both modes of use.

Further features and advantages will appear as a preferred embodiment of the invention is disclosed herein.

DETAILED DESCRIPTION OF A PREFERRED EMBODIMENT OF THE INVENTION

Figure 1:
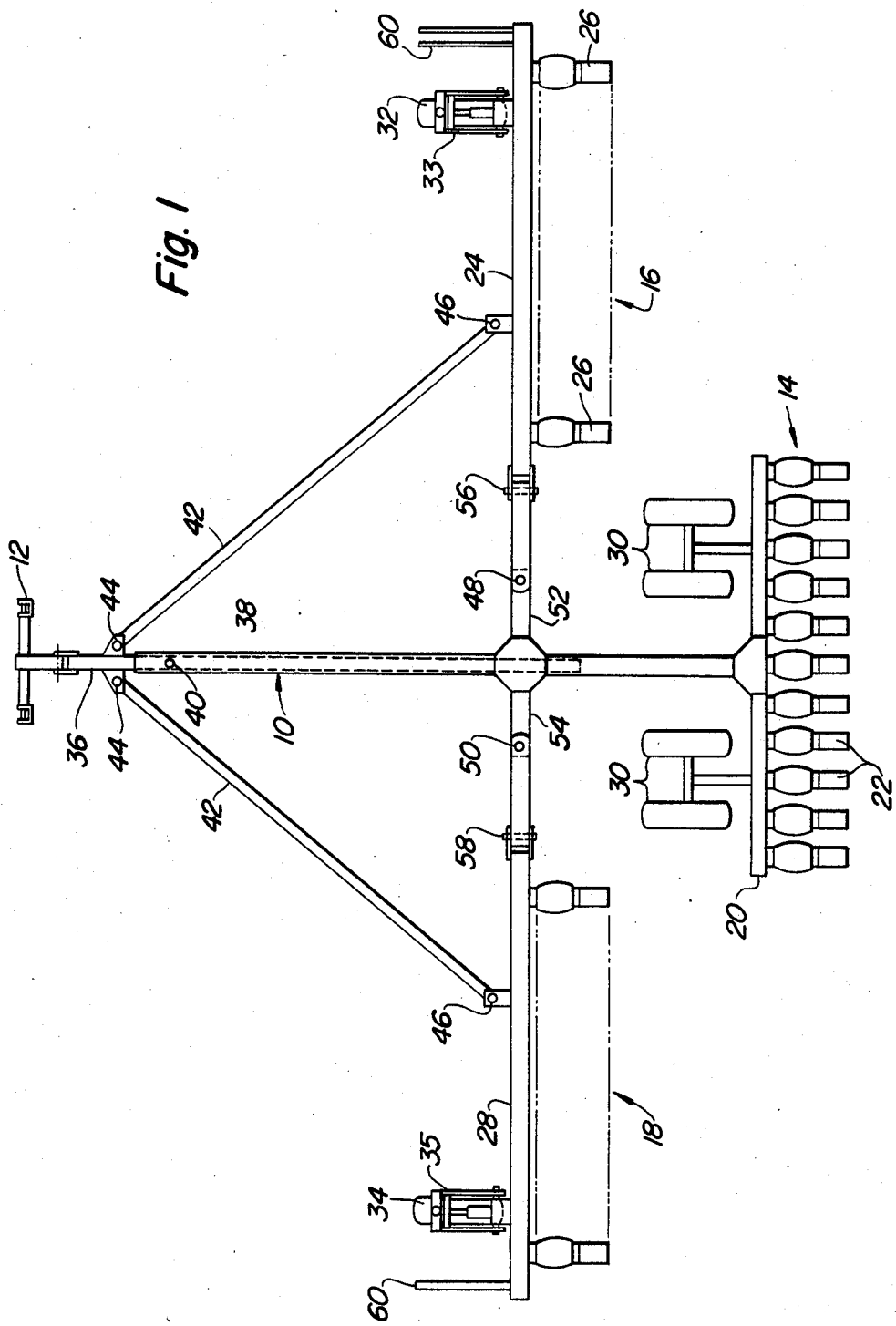
FIG. 1 is a plan of a representative machine, shown in operating mode and in simplified fashion.
Figure 2:
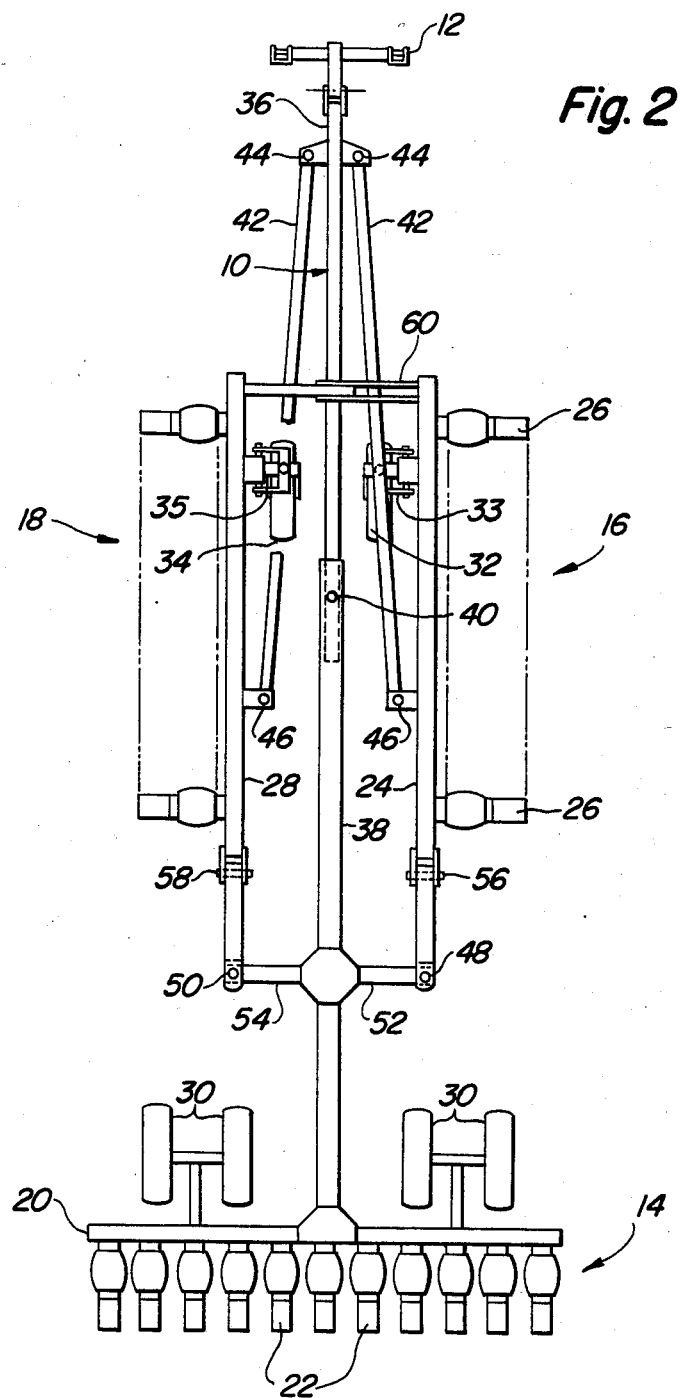
FIG. 2 is a plan of the same machine in its transport mode, the view being further simplified as to the row units in the interests of clarity and brevity.

The machine or implement chosen for purposes of disclosure is a multi-row planter; although, the invention is not limited to planters, since a wide variety of so-called tool bar implements is known and used for other purposes in row crop operations. The machine has a fore-and-aft hitch 10 for connection to a tractor drawbar 12 by means of which the machine is drawn over the field, along roads, etc. The hitch terminates at its rear end at a connection with a rear central implement section 14 and is flanked at opposite sides by right and left wing sections 16 and 18 respectively. The rear section includes a transverse frame member or tool bar 20 on which are mounted several planter units or equivalent tools 22, the mounting including provision for lateral adjustments of the units along the tool bar to vary row spacing. The means for accomplishing adjustment has not been shown, since it may take many forms, including one or more of those presently known. The right wing section 16 likewise has a tool bar 24 on which is supported a plurality of tools 26 (here planter units) similar to those described at 22 and similarly arranged for adjustment as to row spacing. The left section 18 is similar, having a tool bar 28 and adjustable row units.

The tools 22 on the rear section are such that they are located mainly to the rear of the tool bar. Disposed ahead of and in supporting relationship to the tool bar are a plurality of wheels 30. These are preferably arranged as two pairs, one pair at each side of the hitch 10. Since the wheels are ahead of the tools 22, they do not intervene among the units and thus do not interfere with lateral adjustment of these tools as to extra narrow row spacing. The wing sections 16 and 18 are carried respectively by wheels 32 and 34, connected to the respective tool bars 24 and 28. These wheels are mounted to and located ahead of their respective tool bars by forward outriggers 33 and 35 and thus have the locational characteristics of the rear section wheels as respects being clear of the associated tools.

In the arrangement shown here, each wing section has such lateral width and disposition that its innermost end portion is spaced laterally outwardly of the hitch, the spacings at opposite sides being equal. The rear section wheels are disposed behind these spaces. In other words, the inner end portion of each wing section terminates closely laterally outwardly of the neighboring wheel for the rear section. This enables placement of the wheels 30 in an advanced position for improving stability of the machine in both operating and transport modes. The wheels for the wing sections are preferably caster wheels and thus may engage and roll on the ground in both transport and operating modes of the machine as well as during the forwarding folding operation, to be described below.

The hitch and foldability characteristics may be essentially the same as those disclosed in the Pratt patent and thus will be treated only briefly here. The hitch 10 has front and rear parts 36 and 38, telescopically related for fore-and-aft extension and retraction. The hitch is retracted in the operating mode of the machine and has suitable locking means, generally indicated at 40, for locking the retracted hitch parts together. In any suitable fashion, this means is releasable to enable extension of the hitch to achieve the transport mode, as in the Pratt patent. To extend the hitch, whether under hydraulic power (not shown) or by forward motion of the tractor (or both), draft bars 42 are connected at their front ends at 44 to the front part 36 of the hitch and at their rear end at 46 respectively to the wing sections at points laterally outwardly of right and left vertical pivots 48 and 50, respectively, included in mounting means 52 and 54 by which the wing sections are connected to the rear part of the hitch. The means 52 includes a fore-and-aft pivot 56 by means of which the section 16 may "float" as it travels over uneven terrain. A similar pivot 58 is provided in the means 54 for the section 18.

When the machine is in its transport mode, the sections 16 and 18 may be locked together by means such as in the Pratt patent, a representation of which is shown here at 60. Any other suitable latches or means may be used.

A feature of the invention, in addition to those already referred to, is that the sections are wheel supported in both modes of use. This is of significance especially in transport where, as will be seen, the wheels are all fairly well centered and substantially under the center of gravity of the towed machine. It is also of significance in operation, where the tools are raised at the end of the field, or in turning corners, etc. where the instant design offers marked improvements in hitch loading and machine balance. Features not specifically referred to will readily occur to those versed in the art, all without departure from the spirit and scope of the invention.

I claim:

1. A tractor-drawn agricultural machine having a fore-and-aft hitch, a rear central section carried on wheel means at the rear of the hitch and right and left wing sections carried respectively on wheel means at opposite sides of the hitch and all sections carrying tools, and the sections being arranged for disposition transverse to the line of advance in an operating mode and the wing sections are connected to the hitch on vertical axes for forward folding thereof alongside the hitch in a transport mode, characterized in that in both modes the rear section lies rearwardly of the wing sections and the wing section tools and in the operating mode the wing sections lie in transverse alinement in forwardly offset relation to the rear section, the wheel means for all sections are adapted to engage to the ground and support the respective sections in both modes, the wheel means for each wing section is disposed ahead of and mounted to its respective section for angular disposition about a substantially upright axis so as to dispose the rolling axis of that wheel means transverse to the line of advance in both modes, and the wheel means for the rear section are transversely spaced apart and lie ahead of the rear section and rearwardly of the wing sections, wing section vertical axes and wing section wheel means in both modes.

2. The machine according to claim 1, in which each wing section includes a transverse front tool bar and a forward outrigger carried thereby and providing the mounting for the aforesaid upright axis for the respective wheel means in forwardly spaced relation to the tool bar.

3. The machine according to claim 2, in which the wing section wheel means are caster wheels in which the rolling axis of each wheel means trails the associated upright axis in both modes.

4. The machine according to claim 1, in which the wheel means for the rear section includes right and left pairs of wheels disposed respectively at the right and left sides of the fore-and-aft hitch.

* * * * *

UNITED STATES PATENT AND TRADEMARK OFFICE
CERTIFICATE OF CORRECTION

PATENT NO. : 4,596,290

DATED : June 24, 1986

INVENTOR(S) : Harris I. Bedney

It is certified that error appears in the above-identified patent and that said Letters Patent are hereby corrected as shown below:

This patent has been assigned to:

Deere & Company
    John Deere Road
    Moline, Illinois  61265

Signed and Sealed this

Eighteenth Day of November, 1986

Attest:

DONALD J. QUIGG

Attesting Officer     *Commissioner of Patents and Trademarks*